Dec. 17, 1963  F. J. SCHENKELBERGER  3,114,871
ELECTRIC MOTOR TRUCK CONTROL

Filed May 21, 1958  3 Sheets-Sheet 1

INVENTOR.
FRANK J. SCHENKELBERGER
BY
ATTYS.

INVENTOR.
FRANK J. SCHENKELBERGER
BY
ATTYS.

Dec. 17, 1963 F. J. SCHENKELBERGER 3,114,871
ELECTRIC MOTOR TRUCK CONTROL
Filed May 21, 1958 3 Sheets-Sheet 3

INVENTOR.
FRANK J. SCHENKELBERGER
BY
ATTYS.

United States Patent Office 3,114,871
Patented Dec. 17, 1963

3,114,871
ELECTRIC MOTOR TRUCK CONTROL
Frank J. Schenkelberger, Battle Creek, Mich., assignor to Clark Equipment Company, a corporation of Michigan
Filed May 21, 1958, Ser. No. 736,866
10 Claims. (Cl. 318—257)

This invention relates to control systems for electric motors and more particularly to improved hydraulic means for operating a variable resistor in a control circuit for an electric drive motor as employed, for example, in electrically powered industrial lift trucks, or like vehicles.

In brief, my invention contemplates converting force applied to a foot operated accelerator pedal into hydraulic pressure by means of a suitable mechanical linkage system to operate a master hydraulic piston and cylinder of a closed hydraulic control system. The hydraulic force, so obtained, preferably is applied in one of two manners, depending on the functional result desired, to operate a carbon pile resistor which regulates the flow of current to the motor to be controlled. The carbon pile resistor is infinitely variable and composed of a series of carbon discs arranged so that the tighter the discs are squeezed together, the lower resistance they present to the flow of electricity; thus providing, within limits, an infinitely variable rheostat for varying the rotational speed of the drive motor. In the normal operation of my hydraulic control system, the force of the hydraulic pressure is applied to one end of the stationary carbon pile resistor, thus to vary its resistance and the motor's acceleration. When maximum compression of the carbon pile is attained, a means for automatically bypassing the same is available to effect high speed operation of the motor. Such infinite variable control of the motor's speed and vehicle's acceleration is also available for deceleration by utilizing the hydraulic pressure for varying the resistance of the carbon pile in applying reverse torque braking to the motor. Certain electrical and mechanical interlock means are embodied with the control system to prevent full current "plugging" and to prevent energization of the vehicle's drive motor unless the operator's seat of the vehicle is occupied.

The main object of my invention is to provide a new and improved control system for regulating the operation of an electric motor.

Still another object of my invention is to provide a new and improved speed control system for an electric motor used in driving a materials handling vehicle, whereby the vehicle may be operated at infinitely variable rates of acceleration and deceleration.

Another object of my invention is to provide a hydraulic system for controlling the operation of an electric motor.

A further object of my invention is to provide a control system, as aforesaid, which employs hydraulic pressure for varying the compression of a carbon pile rheostat controlling the energization of an electric drive motor in circuit therewith.

A still further object of my invention is to provide a means for controlling the operation of an electric drive motor and for accelerating the motor at a uniform rate in accordance with a predetermined rate of flow of hydraulic fluid.

Another important object of my invention is to provide a hydraulic system including an accumulator for controlling the operation of an electric motor, the accumulator performing as an actuator in certain instances to control operation of the motor.

An additional object of my invention is to provide an improved control system, as aforesaid, which embodies suitable mechanical and electrical interlock means to prevent both initial energization of the electric motor and reversals in the direction of current flow to such motor, when the operating circuit therefor is conditioned for a high rate of current flow.

A still further object of my invention is to provide a new and improved hydraulic control for operating a variable resistance regulatory of the operating speed of an electric motor and to provide for controlled reverse torque braking of the motor.

The above and further objects, features, and advantages of this invention will occur to those familiar with the art from the following detailed description and specifications of a preferred embodiment of the invention, as illustrated in the accompanying drawings.

Figure 1:
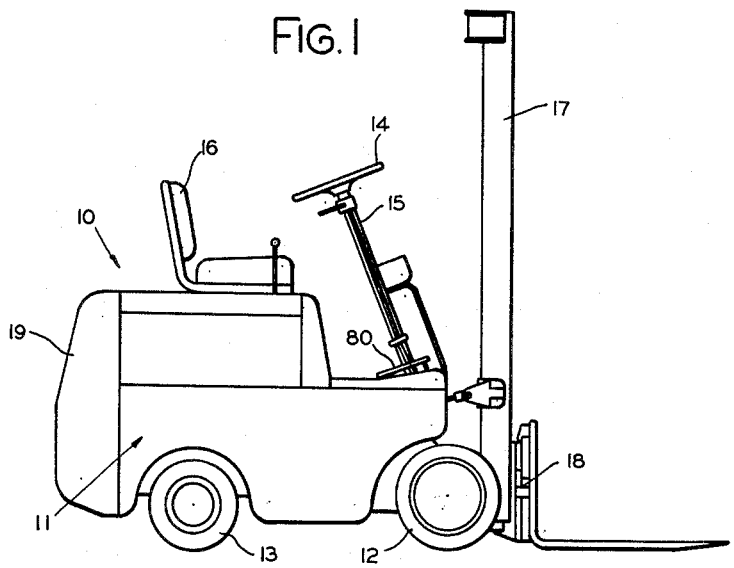
FIGURE 1 is a side elevational view of an industrial lift truck with which the control system of the present invention is embodied.

Although the control system of the present invention is intended for use with commercial vehicles of various types, by way of example, it will be described hereinafter as it relates to an industrial fork lift truck 10, illustrated in FIGURE 1. Vehicle 10 comprises a main frame 11 supported by a pair of ground engaging drive wheels 12 located adjacent the forward end thereof and a pair of ground engaging steering wheels 13 adjacent its rear end. The rear wheel 13 are controlled in their steering movement by conventional linkage operated by a hand steering wheel 14 mounted in the upper end of a steering column 15 forwardly of an operator's seat 16. At the forward end of the truck frame 11 is a generally vertically extending tilting mast 17 which carries a load-supporting fork assembly 18, the latter being movable vertically along the mast 17. A counterweight 19 at the rear end of the truck is normally employed, as illustrated, to counteract the overturning moment imposed by a load on the fork assembly 18. Truck 10 is conventionally driven by a battery powered electrical drive motor 20 which is operatively coupled to drive wheels 12 by means of a conventional torque transmitting means (not illustrated).

Figure 2:
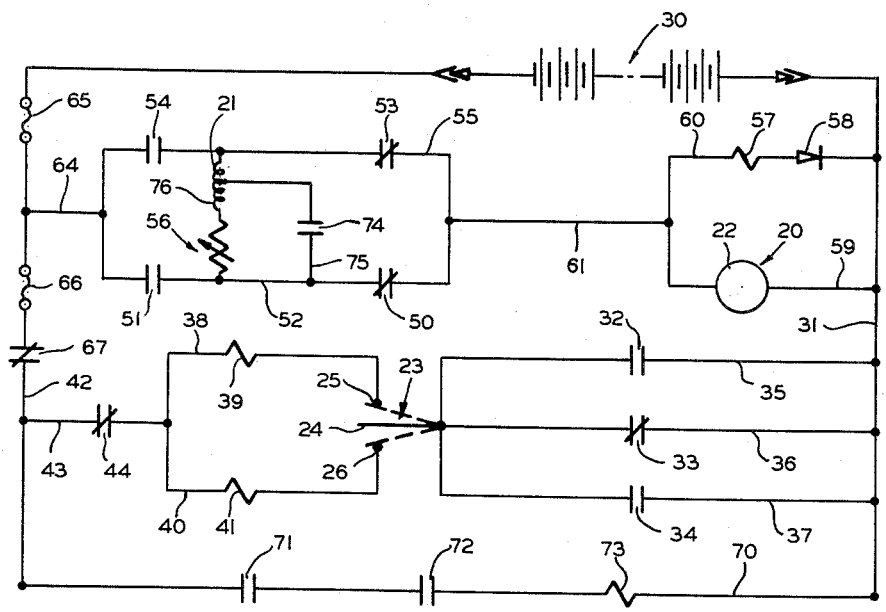
FIGURE 2 is a schematic diagram of the electrical circuit for operating the material handling vehicle of FIGURE 1.

The drive motor 20, together with the electrical control and power circuits therefor, is shown schematically in FIGURE 2 of the drawings and includes a field winding 21 and an armature 22. The components of the drive motor major control circuit include a directional selector switch 23 having a lever operated direction selector switch blade 24 movable from a neutral position to either a forward direction circuit contact 25 or a reverse direction circuit contact 26. Switch 23 is connected to one side of a battery supply 30 over supply conductor 31 and any one of three sets of contacts 32, 33, or 34 associated, respectively, with conductors 35, 36, and 37. Contacts 33, related to a first micro-switch, are normally closed while contacts 32 and 34 are normally open.

The switch blade 24, when engaged with the forward direction contact 25 closes circuit between conductor 36 having closed contacts 33 and a branch conductor 38 to energize a forward direction relay coil 39. In a like manner, closing switch blade 24 with the reverse direction contact 26 connects branch conductor 40 and relay coil 41 in circuit with conductor 36 and the normally closed contacts 33. The two branch conductors 38 and 40 are joined to the other side of the battery and line conductor 42 over conductor 43 and a "dead man" seat interlock switch 44.

Energizing the forward direction relay coil 39 serves to close contact set 32, while energizing the reverse direction relay coil 41 correspondingly serves to close contact set 34; in both instances establishing a hold circuit which continues to control the motor after the micro-switch contacts 33 are opened, as will appear presently.

The armature 22 of the drive motor 20 is powered in series circuit with an interlocked set of normally closed reverse direction contacts 50 and normally open reverse direction contacts 51 of branch conductor 52. The armature is also in series with a second interlocked set of normally closed forward direction contacts 53 and normally open forward direction contacts 54 in a second branch conductor 55; contacts 50 and 51 being operated by relay coil 41 and contacts 53 and 54 being operated by relay coil 39. The field coil 21 of the drive motor 20 is connected in series with a variable resistance carbon pile regulator unit 56 between the branch conductors 52 and 55.

The armature windings 22 are also in parallel circuit with a solenoid coil 57 and a rectifier 58, the latter of which is arranged to prevent energization of the solenoid coil from the battery power source to require its energization by back electro-motive force developed from the motor rotating in one direction, while having a reversing current impressed across its field windings. The motor armature is connected, as illustrated, to power supply conductor 31 over conductor 59, while the solenoid coil 57 and rectifier 58 are arranged in parallel circuit therewith by means of conductor 60. Conductors 59 and 60 are joined to the parallel circuit conductors 52 and 55 over a common conductor 61, while conductors 52 and 55 are in turn joined to the supply line conductor 42 and the other side of the battery by means of conductor 64.

A power circuit line fuse 65, typically 300 amps, a control circuit fuse 66, typically 10 amps, and a key operated ignition switch 67 are also included in line conductor 42, as shown.

In addition to the aforedescribed elements, the electrical control circuitry also includes a parallel circuit conductor 70 extending between line conductors 31 and 42 to join a second micro-switch 71, a normally open pressure switch 72, and a relay coil 73 in series circuit relationship. When energized, coil 73 serves to close a set of contacts 74 connected, by conductor 75, in parallel circuit relationship with the carbon pile regulator 56 and arranged to bypass the regulator 56 and a low speed portion 76 of the motor field windings 21, thus to short out the resistor and approximately half of the motor field for high speed operation of the vehicle, as will be amplified hereinafter.

Rotational direction of the drive motor 20 is controlled by the direction of the current flowing through the field windings as determined by the positioning of the direction selector lever and switch blade 24 which closes circuit with either the forward or reverse direction switch contacts 25 or 26. The motor 20 is energized and as a result the vehicle is, therefore, driven in a forward direction if the contact sets 50 and 54 are closed simultaneously. In such condition, current flows from the battery 30 over conductors 31 and 59, motor armature 22, conductors 61 and 52, closed reverse direction contacts 50, the carbon pile regulator 56, motor field windings 21, closed forward direction contacts 54 in conductor 55, and over conductor 64 to line conductor 42 and the other side of the battery. To reverse the rotational direction of the motor, contact sets 51 and 53 are closed simultaneously so that current flows between the battery conductors 31 and 42 over conductor 59, armature 22, conductors 61 and 55, closed forward direction contact 53, field windings 21, the carbon pile regulator 56, closed reverse direction contacts 51, and conductor 64 to the other side of the battery and line conductor 42.

In order to close either contact sets 51 or 54, the direction selector lever and switch blade 24 of the direction control switch 23 must be engaged with the related direction contacts 25 or 26. It will be understood that the relay coil 39 controls the opening and closing operation of the contact sets 32, 53, and 54, while relay coil 41 controls operation of the reverse direction contact sets 34, 50, and 51. Therefore, in order to energize the motor 20 in a forward direction of rotation, for example, the relay coil 39 must first be energized before the relay contacts 53 can be opened and contacts 54 closed.

To accomplish this function, the ignition switch 67, the seat interlock switch 44, and the normally closed micro-switch contacts 33 must be closed. Movement of the direction selector lever to engage the forward direction contact 25 establishes an energizing circuit through conductor 36, contacts 33, switch blade 24, conductor 38, coil 39, conductor 43, and seat switch 44 to the other side of the battery and conductor 42. Upon energization of the coil 39, normally open contacts 32 and 54 are closed and the normally closed contacts 53 are opened. As pointed out previously, closing contacts 32 establishes a hold circuit, so that subsequent interruption or opening of the micro-switch contacts 33 will not result in deenergizing the forward direction coil 39.

In a like manner, the reverse direction coil 41 is energized over conductor 36, closed micro-switch contacts 33, switch blade 24, reverse direction switch contact 26, conductor 40, conductor 43, seat interlock switch contacts 44, line conductor 42, and the ignition key switch 67. Again, upon energization of the reverse direction coil 41, both sets of reverse direction contacts 34 and 51 are closed and the normally closed reverse direction contacts 50 are opened. Contacts 34 establish circuit over conductor 37 to hold relay coil 41 energized after micro-switch contacts 33 are opened.

Speed of the motor is controlled in both the forward and reverse drive conditions, as above described, by changing the pressure applied to the carbon elements of the variable resistor or carbon pile regulator 56. This results in varying the resistance offered by such regulator 56 and accordingly adjusts the flow of current to the motor. Such a carbon pile regulator further provides infinite variation in speed control for the motor to thereby desirably produce stepless acceleration and deceleration control of the vehicle in both the forward and reverse directions. When the carbon elements of regulator 56 have been compressed a predetermined amount, contacts 74 may be closed to short out the regulator and the low speed motor field windings 76. The closing of the contacts 74 is conditioned, however, on the energizing of the relay coil 73 therefore which is determined by closing the second micro-switch contacts 71 and the pressure switch contacts 72, the latter of which are associated with the hydraulic control means utilized for applying pressure to the carbon pile regulator 56, as will now be described.

Figure 3:
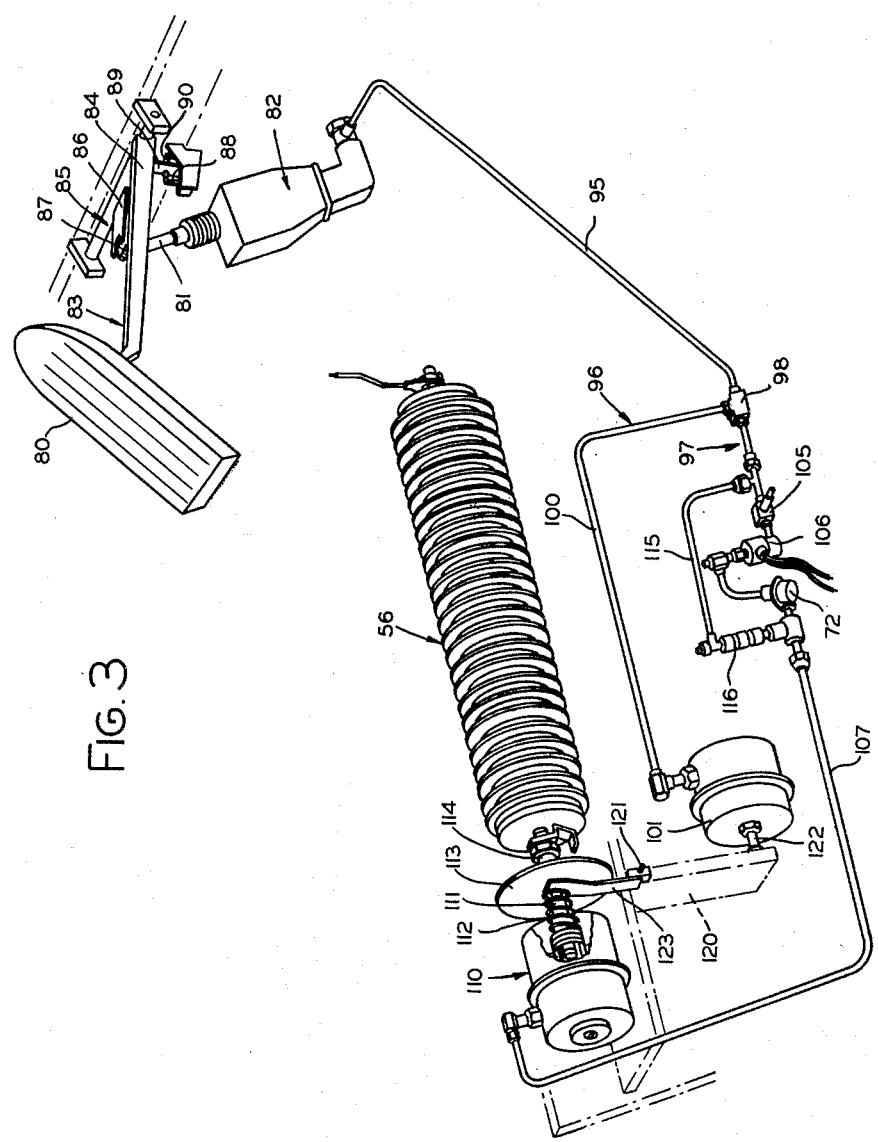
FIGURE 3 is a perspective view schematically illustrating the arrangement of the hydraulic control system for regulating the carbon pile resistor unit used in the electric motor circuit of FIGURE 2.

Turning now to the features and organization of the hydraulic control means employed for regulating the compression of the carbon pile regulator 56 in the above described electrical circuit, reference is made to FIGURE 3 of the drawings. It will be understood from FIGURE 3, that a pivotally movable accelerator pedal 80, associated with the vehicle 10 in a conventional manner, is arranged to operate piston 81 of a master hydraulic cylinder 82 through a suitable actuating linkage arrangement, indicated generally by numeral 83.

Linkage 83 includes a first lever arm 84 which is slidingly engaged at its outer end by the underside of the foot operated pedal 80 and is attached at its other end to a horizontal pivot axle 85 so that arcuate movement of lever 84 rotates axle 85. Axle 85 also has rigid connection with a second lever arm 86 extending outwardly therefrom to overlie the upper end of the piston rod 81. A leaf spring element 87 is interposed between the lever arm 86 and the piston rod 81 to hold the accelerator pedal in a raised condition until such is depressed by the operator. Spring 87 also serves a secondary purpose, in that its initial flexure or depression is required before the secondary lever 86 engages the upper end of the master cylinder piston rod 81. This provides a limited lost-motion connection, requiring a corresponding limited lost-motion depression of the accelerator pedal before piston 81 is moved.

Such lost motion of the accelerator pedal is utilized to actuate an operating plunger 88 of the microswitch 33 through an operating finger 89 depending from the pivot shaft 85. With this arrangement, the normally closed microswitch contacts 33 may be opened or actuated within the lost motion or initial depression action of the accelerator pedal 80 and before piston 81 is moved. Depression of the accelerator pedal beyond its lost motion limit actuates piston 81. Full depression of the accelerator pedal further engages finger 89 with the operating plunger 90 associated with the second micro-switch 71, so that the same is closed only when the accelerator pedal is fully depressed or substantially so.

Pressure on the accelerator pedal 80 is transmitted to the master hydraulic cylinder 82 and thereat transformed into hydraulic pressure which is transmitted by a suitable conduit 95 and a related piping system to one end of a fixed carbon pile regulator 56. The transmission of hydraulic pressure to the carbon pile regulator may take place over either one of two hydraulic branch circuits, labeled generally 96 and 97 and which branch outwardly from the main supply conduit 95 over a T-connection 98 therein.

The first branch system 96 includes a conduit 100 and serves hydraulic accumulator 101 which is designed to momentarily store the hydraulic fluid or oil of the closed circuit system in the event that the accelerator pedal is depressed too rapidly, for instance.

The second branch circuit 97 normally serves to operate the regulator and includes an adjustable needle or orifice valve 105 and a solenoid valve 106 designed to stop the flow of fluid through the branch 97 in response to energization of solenoid coil 57. Oil passing through the solenoid operated valve 106 is transmitted directly to a pressure switch 72 and from there by conduit 107 to a hydraulic actuator comprising a piston and cylinder arrangement 110, which has an actuator piston rod 111 surrounded by a minimum pressure spring 112 and connected to a shield disc or plate 113. Plate 113, in turn, abuttingly engages a ceramic insulator 114 designed to transmit axial compressive force to the carbon pile regulator 56. The actuator circuit 97 also includes a bypass branch line 115 containing a one-way check valve 116 adapted to bypass the orifice or regulator valve 105, solenoid operated valve 106, and the pressure operated switch 72. Check valve 116 permits prompt return flow of hydraulic fluid to the master cylinder, so that hydraulic pressure in the actuator and accumulator may be relieved coincidental with the removal of the operator's foot from accelerator pedal 80 and release of the master cylinder piston 81.

In addition to the hydraulic force transmitted to the carbon pile regulator through the normal operation of the actuator 110 and the hydraulic branch circuit 97, compressive force may also be applied to the carbon pile regulator by the accumulator 101 in certain operation circumstances. This is accomplished through a pivotal linkage arm 120 which moves about pivot center 121 and is engaged at one end by the piston actuator rod 122 of the accumulator 101, the latter of which comprises a cylinder and piston arrangement wherein hydraulic pressure transmitted to the accumulator circuit 96 works the piston against a return spring, all in a conventional and known manner. A leaf spring 123 is fixed at its lower end to the accumulator actuated lever 120 and engages the shield plate 113 at its upper end adjacent the same area where such shield plate is connected to the piston rod 111. It will be understood that with this arrangement fluid applied to the accumulator, as for example, when the solenoid valve 106 is closed, will be transmitted as hydraulic pressure and act directly through the lever 120 and spring 123 to compress carbon pile regulator 56. In this respect, it should be recognized that the maximum force which the accumulator may apply to the carbon pile unit is limited by the force which the flexible leaf spring 123 is capable of transmitting.

Having thus outlined the hydraulic system which applies compressive force to the carbon pile regulator, the specific operating features and purposes of the various elements embodied therein will now be discussed. To this end, the actuator circuit 97 will first be considered.

The needle valve 105 of the actuator circuit 97 effects a predetermined time delay or rate of flow for the hydraulic fluid, so as to produce a given time limit for the actuator 110 to compress the carbon pile unit 56 with maximum hydraulic pressure. This, therefore, limits the rate of acceleration for the vehicle.

The solenoid valve 106 is operable only at the energization of the solenoid coil 57, which in turn is energized by the back E.M.F. of the motor, the solenoid valve closing to disrupt the flow of pressurized fluid to the actuator over the circuit 97. These operating conditions for solenoid 106 reveal that energization of solenoid coil 57 from the back E.M.F. of the motor is possible only in those instances of motor operation where the armature is rotating in a direction opposite to the rotational sense required by the flow of electric current through the field windings. This occasion arises, for instance, upon quick reversal of the direction selector switch, as when the vehicle is going forward and it is desired to reverse its direction. In such instances, movement of the direction selector switch to engage the reverse direction switch contact 26, immediately disrupts the circuit through the forward direction relay coil 39, opening contacts 32 and 54 and closing contacts 53. It will be recalled that before the reversing current can be applied to the field windings, however, the reversing contacts 51 must be closed and contacts 50 open. In order to open contacts 50 and close contacts 51, it is necessary to energize the reverse direction relay coil 41. This would be possible by the direct movement of the switch blade 23 from the forward contact 25 to engage reverse contact 26 if it were not for the fact that in so moving the switch blade, the same acts as a circuit interrupter or line switch to deenergize the control circuit. Thus, when blade 23 engages the reverse contact 26, coil 41 fails to energize until circuit is established from the supply conductor 31 to the blade 24. Such circuit may be established over the microswitch contacts 33, but which are closed only when the accelerator pedal is raised to relieve pressure on the master cylinder and the hydraulic circuit. By raising the accelerator pedal to close contacts 33, reversing coil 41 is energized to close contacts 34 and 51, and open the normally closed reverse direction contacts 50. This energizes the motor field windings for reverse direction operation.

If the armature 22 is then rotating in a forward direction, a back E.M.F. is present to energize the solenoid coil 57 through rectifier 58 which permits current flow in opposition to battery current, thereby closing solenoid valve 106. When this happens, the flow of fluid in the hydraulic circuit 97 is cut off and transmitted to accumulator 101.

It will be recognized that depression of the accelerator 80, with the solenoid valve 106 closed, places the accumulator in direct circuit with the master cylinder 82, as above described. The accumulator then acts as a secondary actuator to compress the carbon pile regulator through lever 120 and spring 123, thus varying the carbon pile regulator's resistance in the motor circuit to vary the reverse braking torque in response to the hydraulic pressure applied by accelerator pedal operation.

Thus, variable deceleration control for the vehicle is provided, such control being infinitely variable in accordance with the compression of the carbon pile regulator. Preferably, the maximum permissible reverse torque braking which may be applied is just slightly less than that which would decelerate the vehicle sufficiently to lose a load being carried on the lift fork 18. This is to say, the braking torque applied through the manipulation of the accumulator, as above described, is limited to a maximum determined by the force capable of being transmitted by leaf spring 123, this maximum being productive of a safe rate of deceleration for the vehicle, which is predetermined to be less than that required to throw or slide a load off the lift forks 18. The controlled reverse torque braking is also limited to a minimum value determined by the force applied by the minimum pressure spring 112, associated with the actuator 110. Between such minimum and maximum limits, the braking torque is infinitely variable, as above discussed, in accordance with the hydraulic pressure produced at the master cylinder 82.

The solenoid valve 106, in conjunction with the microswitch 33, also serves as an anti-plugging interlock for preventing the application of the full battery load across the motor when the armature 22 is rotating in an opposing direction. This is so since it is necessary for the operator to remove his foot from the accelerator pedal to close micro-switch contacts 33 before the direction relay coils 39 or 41 may be energized to close the forward or reverse direction contactors; until such direction contact sets 51 or 54 are closed, the motor 20 cannot be energized. Thus, "plugging" in the sense of applying full battery power to the motor in reverse sense to the rotational direction of its armature is effectively prevented, yet controlled reverse torque braking is permitted, as above discussed.

The pressure switch 72 provided in the hydraulic circuit 97 is adjusted to close its contacts at a pressure just below the maximum system pressure, as produced by the maximum depression of the accelerator pedal 80. Closing of the pressure switch contacts thus would normally occur prior to depressing the accelerator pedal sufficient to operate the second micro-switch 71. Then closing of the latter's contacts permits energization of the relay coil 73 to close its related contactor 74, thereby shunting the carbon pile regulator and the low speed field winding 76 of the motor. When this happens, the truck is conditioned for high speed operation. The pressure switch 72 guarantees that shorting out of the carbon pile regulator will not occur, however, even though the accelerator pedal be fully depressed to energize the second micro-switch 71, until a desired hydraulic pressure has been achieved in the hydraulic actuator system; determined by the regulator needle valve 105. This feature insures full compression of the carbon pile regulator to its minimum resistance value before the same is shunted out of the motor circuit.

The check valve 116 in the bypassing branch 115 permits free flow return of the pressurized fluid in the actuator 110 to the master cylinder 82 and accumulator 101, by bypassing the restricting needle valve 105. Such immediate relief of the hydraulic pressure in the actuator serves to accordingly decompress the carbon pile regulator and increase its resistance to maximum value. The check valve, therefore, enters into the anti-plug feature, above discussed, as performed by the solenoid valve 106 and the micro-switch contacts 33. It will be understood in this respect that the check valve guarantees that the hydraulic energy stored in the actuator cylinder will not continue to operate the carbon pile after energizing the field windings in reverse to the armature's rotation. If prompt relief of fluid pressure from the actuator, such as is accommodated by the check valve 116, were not provided for, "plugging" could occur upon energizing a reversing direction circuit, since pressurized fluid might be trapped in the actuator and continue to hold the carbon pile regulator in a compressed condition, in which condition the regulator would impose little resistance in the field winding circuit. In the illustrated embodiment of the invention, this "plugging" condition could continue until the needle valve 105 had permitted the pressure stored in the actuator 110 to bleed off, which would require a significant period of time during which the solenoid valve could be closed, in which latter event, the actuator might remain hydraulically "locked" in a regulator compressing condition. The capacity of the by-pass circuit for immediate relief of fluid pressure from the actuator, together with the necessity for the operator to release the accelerator pedal in order to effect motor reversing, thus assures against a "plugging" condition.

From the foregoing, it is believed that those familiar with the art will readily appreciate the improved features for operating a carbon pile regulator afforded by the hydraulic control system of this invention. In particular, it is significant that an effective interlock against full current "plugging" is provided, while permitting, within predetermined limits, an effective and infinitely variable, reverse torque braking control of the motor through the operation of the hydraulic accumulator as a secondary actuator. It will be understood also that the provision of a hydraulic actuator circuit provides for stepless speed variation and simplified control of the carbon pile regulator, directly by the operator, while the needle valve 105 requires a predetermined time delay in applying the full compressive force to the carbon pile regulator. The check valve 116 permits free return flow of the hydraulic fluid to also prevent "plugging" by virtue of accumulated pressure energy in the actuator. The micro-switch 33, operated only within initial depressing movement of the accelerator pedal, joins with such check valve and the solenoid operated valve 106 to prevent the application of full battery load to the motor in reverse to either forward or reverse direction motor operation, when the carbon pile regulator is compressed to a minimum resistance condition. It will also be understood from the foregoing that the lever operated direction switch acts as line interrupter in the control circuit at the change of selected direction. This feature operates to deenergize the forward and reverse relay coils and contacts and resultingly requires closing of the micro-switch contacts before a reversing circuit for applying energy to the field windings, contrary to the rotational direction of the armature, may be energized. This further guarantees against full current "plugging" of the motor.

While the foregoing description sets forth the principal features and operational advantages of my improved invention, a regulatory adjustment to accommodate linear or axial expansion and contraction of the carbon pile regulator due to operational temperature change is desirable, since a movement of the carbon pile relative to the actuator piston 111 effectively alters the force capable of being applied to the carbon pile regulator for a given value of hydraulic pressure in the actuator. In order to compensate for this factor, an automatic compensator means is incorporated in the hydraulic actuator 110.

Figure 4:
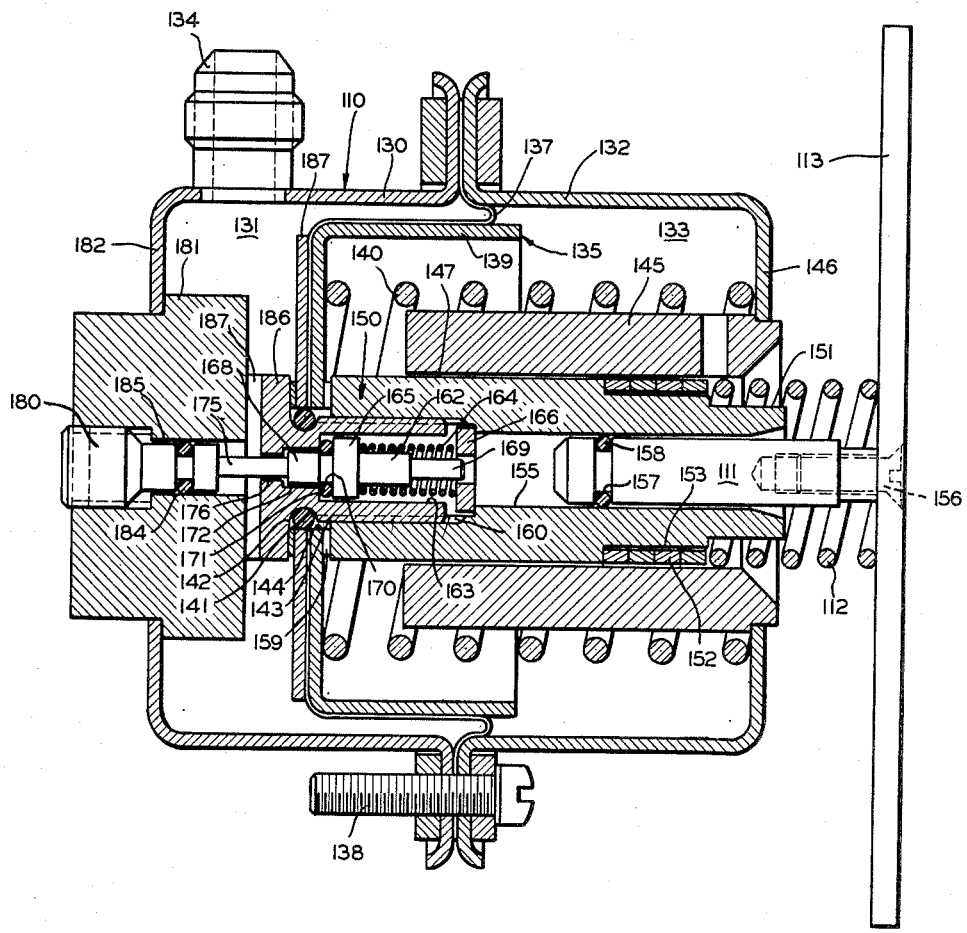
FIGURE 4 is a cross-sectional view of the hydraulic actuator employed in the hydraulic control system of FIGURE 3 and illustrating certain detailed features of its construction.

As seen in FIGURE 4, actuator 110 includes a two-part housing having a first shell portion 130 which encloses a hydraulic chamber 131 and a second shell portion 132 abuttingly engaged with the first shell portion to enclose an air chamber 133. The hydraulic chamber 131 has a hydraulic fluid inlet 134, while air chamber 133 vents to atmosphere.

A cup-shaped piston assembly 135 is movable in and between the two chambers 131 and 133 in response to the application of pressurized fluid on the hydraulic side of a flexible diaphragm 137 which is attached to the piston assembly 135 and is sealed at its outer periphery between the two shell portions 130 and 132 by plural holding bolts 138. The piston assembly 135 includes a cup-shaped piston member 139 movable towards air chamber 133 against a return spring 140. The piston 139 is supported concentrically within the housing portions 130 and 132, and engages the outer periphery of an annular O-ring seal 141 held in an annular recess 142 of a plunger supporting threaded collar, extending axially through a central opening 144 of the piston 139.

The return spring 140 is concentrically supported within the cup-like piston 139 and surrounds a cylindrical guide sleeve 145 which is brazed at one end in a suitable opening formed in an outer end wall 146 of the housing shell 132. The guide sleeve is formed with a central axial bore 147 into which a tubular piston 150 is fitted for sliding movement. Piston 150 has a reduced portion 151 at its outer end disposed concentrically inward of the minimum pressure spring 112. The axially innermost end of the minimum pressure spring 112 abuts one of a number of annular spacer members 152 mounted concentrically about the tubular piston 150 and surrounding a cylindrical shoulder 153. The spacers may be varied in number and size to regulate the zero load compression of spring 112, thereby adjusting its minimum pressure engagement with plate 113.

The tubular piston 150 is also formed with a central axial chamber bore 155 which receives the actuator piston 111; the latter being connected to the shield plate 113 by a screw member 156. An annular recess 157 is provided adjacent the inner end of the actuator piston for housing an annular O-ring seal 158, and such provides an oil tight seal between the piston and the side walls of the chamber bore 155. The axially innermost end of the tubular piston 150 abuts a washer 159 which is disposed on the bottom wall of the diaphragm actuated piston 139. Tubular piston 150 moves with the cup-shaped piston 139, the latter serving to compress return spring 140, while the piston 150 compresses the minimum pressure spring 112.

The collar 143 is threaded into an axial bore 160 formed inwardly of the left-hand end of the tubular piston 150 (see FIGURE 4) and communicating coaxially with the chamber bore 155, while a pilot plunger 162 is disposed within an axial pilot chamber bore 163 of the collar. Plunger 162 is surrounded at one end by a compression spring 164 which serves to return the pilot plunger to the left, as seen in FIGURE 4. Spring 164 is engaged at one end by an enlarged annular shoulder 165 of the plunger and at its opposite end by an annular washer 166 mounted over the inner end of the axial bore 160. The pilot plunger includes a reduced cylindrical neck portion 168 adjacent its axially outermost end and a pilot extension 169 at its axially innermost end. The pilot extension passes through the washer 166 and serves thereby to guide the plunger in chamber 163. An O-ring seal 170 surrounds the neck portion 168 to effect a seal with the adjacent face of shoulder 165 and a shoulder face 171 at the bottom or inner end of the pilot chamber 163.

From examining FIGURE 4, it will be recognized that neck portion 168 rides in a cylindrical bore 172 of the collar 143 and is integral with a finger portion 175 which extends axially therefrom and through a small bore 176 in the collar to project axially outward of the latter. Finger portion 175 is intended to periodically engage an adjustable stop 180 carried coaxially within a stop bushing 181 fixed to the end wall 182 of the housing shell portion 130 and an annular O-ring seal 184 is provided to prevent the escape of pressurized fluid from the hydraulic chamber 131 past the stop member. The stop 180 is adjustable in the respect that it may be adjustably moved toward and away from the finger 175 of the pilot plunger along a bore 185 in which it is mounted. The stop 180 normally engages the pilot finger when the hydraulic pressure is relieved from chamber 131 so that return spring 140 may force head portion 186 of the pilot collar 143 into abutting engagement with the stop bushing 181. In this regard, it will be noted that the collar's head portion 186 is suitably slotted at 187 to provide communication between the fluid chamber 131 and the axial bores therein.

With the above-described arrangement, fluid under pressure directed through the inlet port 134 will cause the piston 135 to move to the right, as viewed in FIGURE 4, compressing the return spring 140 and permitting the O-ring 170 to perform as a seal as it is pressed against the adjacent faces of the enlarged shoulder portion 165 of the pilot plunger and the bottom wall or shoulder 171 of the pilot collar chamber 163. Hydraulic fluid within the pilot piston chamber 163 and the bore 155 which houses the actuating piston 111 is thereby effectively locked between the O-ring seals 158 and 170, so that the hydraulic force exerted on the piston assembly 135 is transmitted directly to the carbon pile resistor through the actuator piston 111. When the operator removes his foot from the accelerator pedal, however, this relieves the hydraulic pressure of the closed hydraulic circuit, and the piston assembly is returned to the left, as viewed in FIGURE 4, under the influence of the return spring 140. This activity eventually brings the finger portion 175 of the pilot plunger 162 into engagement with the adjustable stop 180, moving the O-ring 170 out of sealing engagement with the adjacent shoulder 171 in the pilot plunger chamber 163. Since the fluid within the hydraulic chamber 131 is in communication with the O-ring seal 170 by way of the slotted openings 187 in the head of the collar member 143 and the spacing around the plunger portions 168 and 175, it will be readily understood that hydraulic pressure is equalized between the fluid chamber 131 and plunger chamber 163 whenever O-ring 170 is unseated. The unseating of O-ring 170 occurs, as above noted, every time the operator removes his foot from the accelerator pedal to bring the pressure of the fluid of the hydraulic control circuit to zero or a minimum value.

Such communication of the fluid in the lockup chamber between the O-rings 158 and 170 with the fluid chamber 131 in the actuator, effectively accommodates the position of the actuating piston 111 to compensate for any change in length of the carbon pile regulator. Thus, if the length of the regulator has grown or increased, the pressure of the fluid between the O-rings 158 and 170 will be greater than that in chamber 132. Therefore, unseating of O-ring 170 will permit the escape of sufficient amount of fluid past the pilot plunger and into chamber 131 to provide the required movement of the actuating piston relative to the tubular piston 150 and axially toward the pilot plunger. On the other hand, if the carbon pile regulator has decreased in length, the minimum pressure spring 112 will move the actuating piston 111 to the right, toward the carbon pile regulator, as seen in FIGURE 4, when the actuator pressure is relieved. This then places the lockup chamber between the O-rings 170 and 158 under an effective vacuum, so that when O-ring 170 is unseated, such lockup chamber is supplied with additional hydraulic fluid from the chamber 131 in the actuator.

From the foregoing, it is believed that those familiar with the art will readily understand and appreciate the novel features and advantages which the present invention presents. It is further to be understood that while I have herein shown and described the features and concepts of my invention as they are related to the operation and control of an industrial lift truck, such area of use is by no means to be considered a restrictive limitation on the scope of my invention. Also, it will be appreciated that numerous changes, modifications, and substitutions of equivalents may occur in the particular apparatus and control systems hereinabove described without necessarily departing from the spirit and scope of my invention. As a consequence, it is not my intention to be limited to the particular embodiment herein shown and described, except as may appear in the following appended claims.

I claim:

1. In control means for a vehicle having an electric drive motor, a pressure responsive carbon pile regulator for steplessly varying the flow of electric current to said motor thereby to uniformly regulate its rotational speed, forward and reverse direction selector switch means electrically controlling the motor's direction of rotation, continuously operable hydraulic control means including hydraulic actuator means effective for continuously increasing and decreasing the pressure exerted on said regulator means by said hydraulic control means and hydraulic accumulator means operatively associated with said regulator, and means responsive to back E.M.F. of said motor for isolating said actuator in said control system and for rendering said accumulator means operative to compress and decompress said regulator thereby selectively to control deceleration of said motor.

2. In control means for a vehicle having an electric drive motor, a carbon pile regulator means for steplessly adjusting the rotational speed of the motor, a hydraulic control circuit including a continuously operable hydraulic actuator for axially and continuously exerting variable pressure on said regulator to selectively adjust its resistance and the rotational speed of the motor, an accumulator in said control circuit, an accelerator pedal for varying hydraulic pressure in said control circuit, a direction selection switch for controlling the rotational direction of the motor, electrical interlock means operatively responsive to the actuation of said accelerator pedal and requiring relief of pressure on said regulator prior to the energization of said motor in a sense reverse to the direction of rotation for its armature, electrically controlled valve means in said control circuit operable in response to counter E.M.F. of the motor for stopping flow of hydraulic fluid to said actuator, and means operated by said accumulator for selectively compressing and decompressing said regulator in response to manipulation of said accelerator pedal when said valve means is operated.

3. The combination as set forth in claim 2 in which there is also means in said hydraulic circuit operable independently of the manipulation of said accelerator pedal for controlling the rate at which said regulator may be compressed by said actuator.

4. The combination as set forth in claim 2 in which there is also a switch means operable by the manipulation of said accelerator pedal for shunting said regulator to condition the motor for high speed operation.

5. The combination as set forth in claim 2 in which there is also a pressure switch means responsive to a predetermined hydraulic pressure in said control circuit for shunting said regulator to condition the motor for high speed operation.

6. The combination of claim 2 in which there is also additional means compensating for the thermal axial expansion and contraction of said regulator.

7. In control means for a vehicle having an electric drive motor, a carbon pile regulator means for steplessly adjusting the rotational speed of the motor, a hydraulic control circuit including a continuously operable hydraulic actuator effective for axially and continuously compressing said regulator to variable extent effective for selectively operating its resistance and the rotational speed of the motor, an accelerator pedal for varying hydraulic pressure in said control circuit thereby to control the rotational speed of the motor, electric circuit means for shunting said regulator to condition the motor for high speed operation, switch means actuated by said accelerator pedal upon depression thereof for controlling said electric circuit means, means for delaying energization of said electric circuit means subsequent to actuation of said switch means upon depression of said pedal, a direction selection switch for controlling the rotational direction of the motor, electrical interlock means operatively responsive to actuation of said accelerator pedal and requiring decompression of said regulator prior to energization of said motor in a sense reverse to the direction of rotation for its armature, and electrically controlled valve means in said control circuit operable in response to counter E.M.F. of the motor for stopping flow of hydraulic fluid to said actuator until said armature slows down to a predetermined speed of rotation.

8. In control means for a vehicle having an electric drive motor, a pressure responsive regulator for steplessly varying the flow of electric current to said motor to thereby uniformly regulate its rotational speed, forward and reverse switch means controlling the direction of rotation of said motor, continuously operable hydraulic means operable independently of the speed of rotation of said motor and effective for selectively and continuously applying variable operating pressure to said regulator, and interlock switch means in circuit with said forward and reverse switch means and interlockingly operative with said hydraulic means effective for assuring release of actuating pressure from said regulator prior to reversal of the direction of rotation of said motor responsive to operation of said forward and reverse switch means.

9. In control means for a vehicle having an electric drive motor, a pressure responsive carbon pile regulator for steplessly varying the flow of electric current to the field windings of said motor to thereby uniformly regulate its rotational speed, forward and reverse switch means selectively controlling the direction of rotation of said motor, continuously operable hydraulic control means operable independently of the speed of rotation of said motor and effective for continuously applying variable operating pressure to said regulator, interlock switch means responsive to operation of said hydraulic control means for precluding reversing of said motor prior to release of operating pressure on said regulator, said interlock switch means being operable independently of reversing operation of said forward and reversing switch means, means for regulating the rate at which said hydraulic control means may apply operating pressure to said regulator, and means for releasing said regulator from operating pressure preliminary to reversal of the direction of rotation of said motor.

10. In control means for a vehicle having an electric drive motor, a carbon pile regulator for steplessly adjusting the rotational speed of the motor, a hydraulic control circuit comprising a continuously operating actuator operable independently of the speed of rotation of said motor and effective for axially and continuously compressing said regulator to variable extent effective for adjusting its resistance and the rotational speed of said motor, an accelerator pedal operable independently of the speed of rotation of said motor for varying hydraulic pressure in said control circuit thereby to control the rotational speed of said motor, electric circuit means for shunting said regulator for high speed operation of said motor, switch means operable responsive to operation of said accelerator pedal for controlling said electric circuit means, and means for delaying energization of said electric circuit means subsequent to actuation of said switch means.

References Cited in the file of this patent

UNITED STATES PATENTS

| | | |
|---|---|---|
| 2,134,900 | Von Ohlsen | Nov. 1, 1938 |
| 2,267,381 | Ulinski | Dec. 23, 1941 |
| 2,386,304 | Elberty | Oct. 9, 1945 |
| 2,397,213 | Smith | Mar. 26, 1946 |
| 2,454,291 | Penrose | Nov. 23, 1948 |
| 2,890,683 | Pilch | June 16, 1959 |
| 2,911,053 | Ayers et al. | Nov. 3, 1959 |

FOREIGN PATENTS

| | | |
|---|---|---|
| 512,724 | Great Britain | Sept. 25, 1939 |

UNITED STATES PATENT OFFICE
CERTIFICATE OF CORRECTION

Patent No. 3,114,871                                                    December 17, 1963

Frank J. Schenkelberger

It is hereby certified that error appears in the above numbered patent requiring correction and that the said Letters Patent should read as corrected below.

Column 11, line 9, strike out "means", first occurrence; line 61, for "operating" read -- adjusting --.

Signed and sealed this 28th day of April 1964.

(SEAL)
Attest:

ERNEST W. SWIDER                                         EDWARD J. BRENNER

Attesting Officer                                             Commissioner of Patents